Jan. 20, 1942.   E. W. WEAVER   2,270,664
INDUSTRIAL TRUCK
Filed Nov. 6, 1940   2 Sheets-Sheet 1

INVENTOR.
ELVERTON W. WEAVER
BY Hull, West & Chilton
ATTORNEYS.

INVENTOR.
ELVERTON W. WEAVER
BY Hull, West & Chilton
ATTORNEYS.

Patented Jan. 20, 1942

2,270,664

UNITED STATES PATENT OFFICE 2,270,664

INDUSTRIAL TRUCK

Elverton W. Weaver, Cleveland Heights, Ohio, assignor to Towmotor Co., Cleveland, Ohio, a copartnership composed of Lester M. Sears, Ruth P. Sears, Mary Ann Sears, and Anna L. Sears Application November 6, 1940, Serial No. 364,537

7 Claims. (Cl. 214—113)

This invention relates to industrial trucks, and more particularly to the construction and arrangement of parts employed for the lifting and movement of the loads transported by such trucks.

The general object of my invention is to provide such trucks with means whereby the load-engaging members of the carriages thereof may be moved laterally with respect to such carriages and may also be adjusted laterally with respect to each other, whereby handling and disposition of the articles engaged by the said members may be facilitated.

A further object of my invention is to provide simple and effective power mechanism for so moving and adjusting the load-engaging members.

Figure 1:
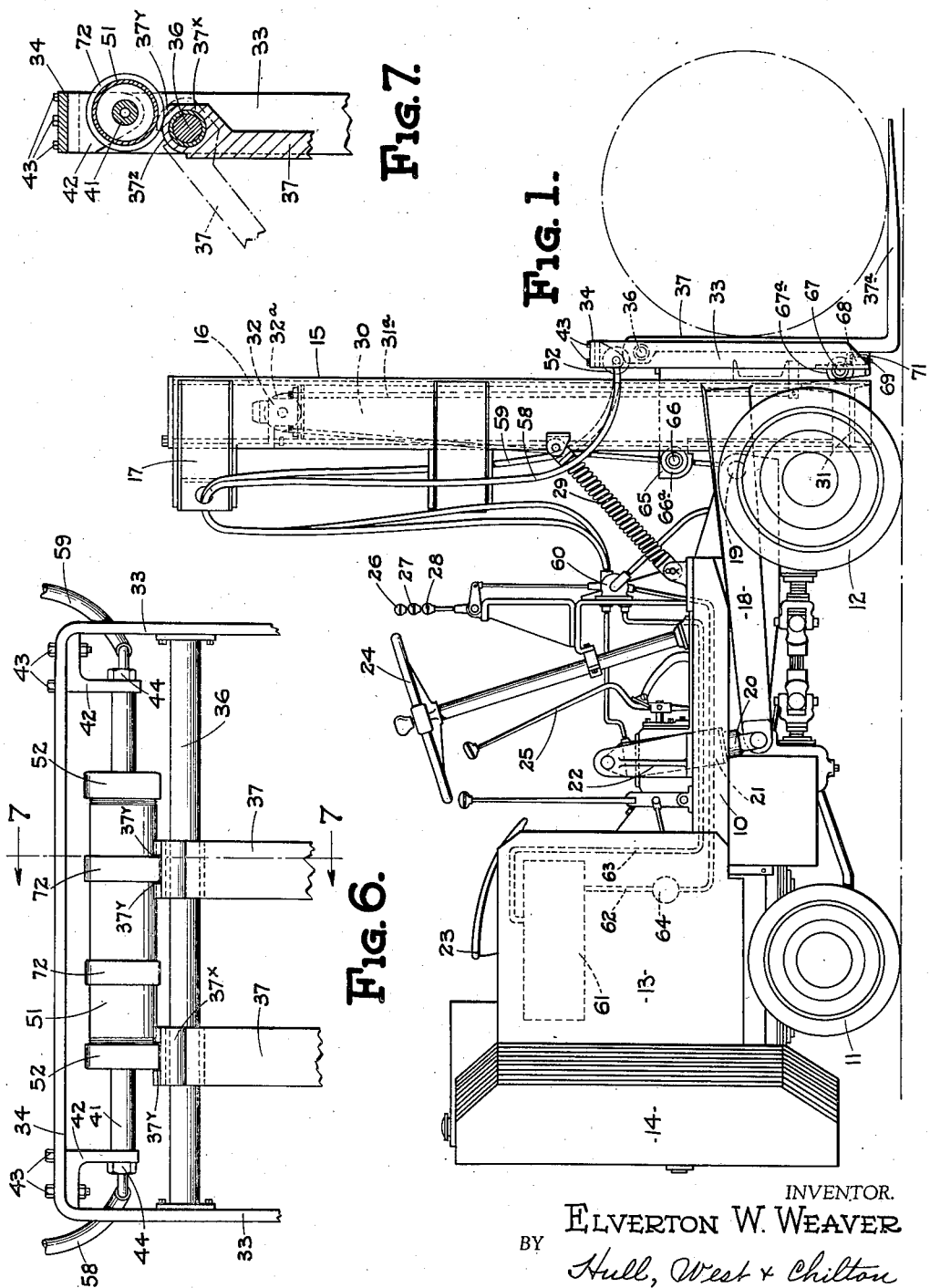
Figure 2:
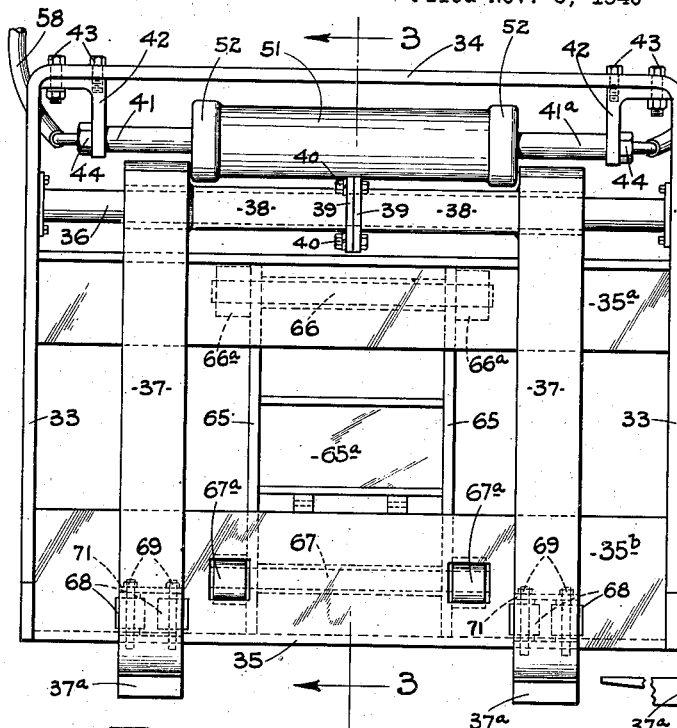
Figure 3:
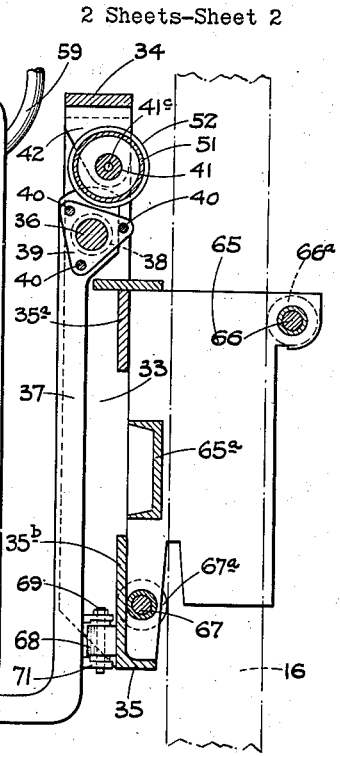
Figure 4:
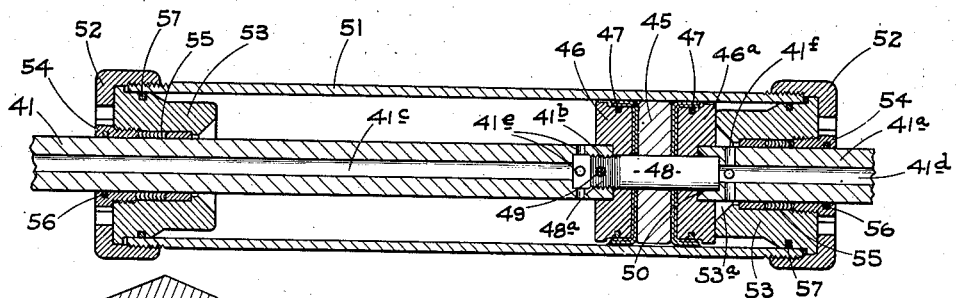
Figure 5:
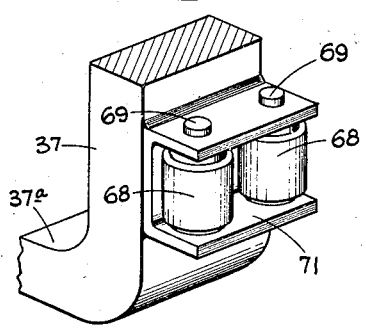

Still further and more limited objects of the invention will be set forth in connection with the description of the embodiment of my invention, shown in the drawings hereof, wherein Fig. 1 represents a side elevation of an industrial truck having my invention applied thereto; Fig. 2 a detail in front elevation of the carriage and load-engaging members or forks shown in Fig. 1; Fig. 3 a detail in section corresponding to the line 3—3 of Fig. 2; Fig. 4 a central longitudinal sectional view through the cylinder shown in Fig. 2; Fig. 5 a detail in perspective of the lower end portion of one of the forks shown in Fig. 2; Fig. 6 a detail in elevation of a modification of the invention shown in Fig. 2 and illustrating the manner in which the load-engaging members may be adjusted relatively to each other; and Fig. 7 a detail in section corresponding to the line 7—7 of Fig. 6.

Describing by reference characters the various parts illustrated in the drawings, 10 denotes generally the body frame of an industrial truck having rear steering wheels 11 and front wheels 12, which may be driven by suitable connections from an internal combustion engine (not shown) within the hood 13 on the rear of the frame, the radiator of the said engine being protected by plates 14 which also serve to counterbalance the load carrier and the load thereon.

The mast shown herein is of the extensible type comprising a pair of outer side members, one of which is shown at 15, and a pair of inner side members (one of which is indicated at 16) which are slidable upon the outer side members. The upper ends of the outer side members are preferably connected by a transverse brace member, indicated at 17.

Extending rearwardly from and rigidly connected to the lower portion of each of the side members 15 is an arm, one of which is shown at 18, each of said arms being pivoted upon a cross shaft 19 carried by the frame and the rear end of each arm being pivotally connected to a piston rod 20, projecting from a hydraulic cylinder 21, the upper end of each of which cylinders is pivotally supported between a pair of upright brackets mounted upon the frame 10, one of said brackets being indicated at 22.

The truck body is also provided with an operator's seat 23, steering wheel 24, gear shift lever 25 and control levers having operating handles 26, 27 and 28, said levers serving to control the supply of operating fluid to the cylinders 21, to the cylinder by which the carriage is raised and lowered, and the cylinder by which the forks are moved transversely of the said carriage.

29 denotes one of a pair of coiled springs which are located on opposite sides of the truck and each of which has its lower end connected to the frame 10 and its upper end connected to its adjacent side member 15. These springs serve to assist the mast in assuming a vertical position after it shall have been tilted rearwardly by pressure fluid in the cylinders 21, it being obvious that the pressure of the fluid in such cylinders will be released before the springs may so assist in returning the mast to a vertical position.

30 denotes a hydraulic cylinder located between the side members of the mast and having its lower end supported by a cross member 31 connecting the lower ends of the side members 15. The upper end of the piston rod is provided with a cross head 32, the opposite ends of which are connected to the inner side members 16. Chains or cables 31a connected at one end to the cross member 31 and extending over sheaves 32a on the cross head and connected at their other ends to the carriage serve to raise the latter along the mast.

The construction thus far shown and described is substantially identical with that which has been employed by the Towmotor Company of Cleveland, Ohio, in its production of industrial trucks and hence needs no further description; it is also substantially identical with that shown in the application of Max Lehmann and Paul Guerin, filed September 3, 1940, Serial No. 355,166, and which application is assigned to the said company.

Carriage

The carriage comprises generally a rectangular frame, with forks supported by said frame, and a hydraulic unit comprising a piston element and a cylinder element for moving said forks laterally of said frame. 33 denotes the side members, 34 the top member, and 35 the bottom member of said frame. 36 denotes a guide rod extending between and connected to the side members 33 below the top thereof. 37 denotes the vertical portions and 37$^a$ the horizontally extending portions of a pair of load-engaging members the said members being in the form of forks. The forks are shown in Fig. 2 as mounted upon the guide rod 36 and connected by sleeves 38, also mounted upon the guide rod 36, the abutting ends of the sleeves being connected by flanges 39 and bolts 40. These sleeves space the load-engaging members or forks a predetermined distance apart. 41 denotes one portion and 41$^a$ the opposite portion of a piston rod which portions are connected to the piston element and which are supported below the upper member 34 of the carriage and above the guide rod 36 by angle brackets 42 secured to the said member 34 by bolts 43. The outer ends of the piston rod members 41 and 41$^a$ are held against longitudinal movement by engaging the inner faces of the brackets 42, being secured in such position by means of nuts 44 threaded upon the reduced ends of the said members extending through said brackets.

Interposed between the adjacent ends of the piston rod members 41 and 41$^a$ is the piston element comprising a piston proper consisting generally of a central cylindrical member 45 interposed between cylindrical members 46, 46$^a$ arranged on opposite sides thereof, with suitable packing rings 47 engaging the sides of the member 45 and the adjacent sides of the members 46, 46$^a$ and extending around peripheral portions of the latter members. A pin 48 extends through the centers of the said piston members, one end of said pin being provided with an external thread 48$^a$ which is received within an internal thread 41$^b$ on the adjacent inner end of the piston rod member 41. The interengaging ends of the pin 48 and piston rod member 41 are shown as connected to the piston member 46 adjacent thereto by a pin 49, the said piston member being recessed for the reception of the end of the said piston rod member.

The piston member 46$^a$ is also provided with a central recess for the reception of the adjacent end of the piston rod member 41$^a$, the inner end of the said piston rod member being provided with a tapered groove surrounding the pin 48 having a packing 50 therein.

Surrounding the piston 45, 46, 46$^a$ is the movable reciprocable cylinder element comprising the cylinder proper 51, the same having heads 52 through which the piston rod members 41 and 41$^a$ extend and the ends of the cylinder being provided with suitable slide bearings each comprising generally an outer sleeve 53, surrounding and spaced from its cooperating piston rod member, with a bearing-member proper, 54, threaded into the outer end of each of the sleeves. Suitable additional packing members are indicated at 55, 56 and 57.

Each of the piston rod members 41 and 41$^a$ is provided with a through bore 41$^c$ and 41$^d$, respectively, the inner end of the former bore being provided with a plurality of ports 41$^e$ communicating with the interior of the cylinder between the piston and the head through which the said piston rod member extends. The inner end of the bore 41$^d$ of the other piston rod member communicates by ports 41$^f$ with the interior of the cylinder on the opposite side of the piston through an outwardly flaring channel 53$^a$ by which, when the piston is in the position shown in Fig. 4, the hydraulic fluid supplied through 41$^d$ can act upon the adjacent face of the piston member 46$^a$.

In the construction shown in Fig. 2, the sleeves 38 which connect the upper ends of the portions 37 of the lifting forks or members are of such length as to enable the projecting upper ends of the said members to be engaged by the abutments on the cylinder, said abutments consisting of the cylinder heads 52.

Hydraulic fluid for moving the cylinder along the piston rod members 41, 41$^a$ is supplied to and from opposite ends of the cylinder by pipes 58 and 59, which are connected to a casing 60 within which valve mechanism is located by which the supply of hydraulic fluid to and from the said pipes is controlled, as well as the supply of fluid to the cylinders 21 and 30. The mechanism within the casing 60 is controlled by levers having the operating handles shown at 26, 27 and 28; and the hydraulic fluid in turn is supplied to and from the said casing by the tank 61, pipes 62 and 63 and pump 64.

When it is desired to move the load-engaging members or forks 37, 37$^a$ in either direction along the guide rod 36, this may be accomplished, as will be readily understood, by supplying hydraulic fluid to one end or the other of the cylinder 51. The extent of movement of the cylinder is positively limited by the engagement of the sleeves 53 with the piston members 46, 46$^a$ whereby impact of the forks against the sides of the carriage frame will be prevented.

As is usual in the construction of industrial trucks of the type to which this invention relates, the carriage, with the mechanism supported thereby, is slidably mounted upon the side members of the mast by means of angular cheek pieces 65. The cheek pieces are shown as secured to an upper channeled brace 35$^a$ and to a lower brace plate 35$^b$ which are secured to opposite sides of the carriage frame, and they support shafts 66 and 67 having rollers 66$^a$ and 67$^a$ thereon engaging respectively the front and the rear of the inner members 16 of the mast which constitute vertical extensions of the same when fluid is supplied to the cylinder 30. The manner of mounting the carriage upon the mast is old and well-known and is preferably substantially the same as shown and described in the aforesaid application of Lehmann and Guerin and, in its details, forms no part of the invention set forth herein.

The ability to adjust the load-engaging members or forks laterally of the frame is found to be particularly advantageous in the transportation and stacking of various materials, including large rolls of paper. In order to compensate for the "cocking" effect produced upon the lower ends of the load-engaging members by the pivotal mounting of the upper ends of said members and the presence of a load on the forwardly projecting portions of said members, I have provided each load-engaging member adjacent to the bottom thereof with a pair of rollers 68 mounted on vertical shafts 69 supported by channeled brackets 71 secured to their respective forks, as shown more particularly in Fig. 5. These rollers travel against the front surface of the brace plate 35$^b$.

With the construction shown in Fig. 2, it is possible to vary the space between the load-engaging members or forks by substituting sleeves 38 of longer or shorter lengths than those shown in the said view. However, I have shown in Figs. 6 and 7 a construction whereby a considerable range of spacing may be secured between these load-engaging members or forks without materially increasing the cost of its production over that shown in Fig. 2. In these views, the cylinder 51 is shown as provided with abutments intermediate of the head abutments 52, which intermediate abutments may be conveniently formed as rings 72, similar to the peripheral portions of the head abutments 52 and preferably of the same width as the head abutments. In this construction, I provide the hub-like top 37$^x$ of each of the load-engaging members or forks with a notch 37$^y$, intermediate of the sides thereof, of such width as to receive therewithin portions of the abutments 52 or 72. The manner in which this adjustment may be effected will be readily understood by reference to Fig. 7, wherein the upper hub-like portion 37$^x$ of one of the load-engaging members or forks is shown as rotated upon the guide rod 36 to a position which will enable a recessed portion 37$^z$ thereof, extending from one end of the notch 37$^y$ and being of the full width of the hub portion 37$^x$, to be brought into full register with the abutment 52 or 72 with which the notch has been engaged, whereupon the said load-engaging member or fork may be slid upon the rod 36 until the notch thereof is brought into register with another abutment and then swung down into the abutment-engaging position shown in full lines.

Having thus described my invention, what I claim is:

1. In a truck, the combination of a frame, a substantially vertical mast supported by said frame, a carriage, and means for moving the same along said mast, a pair of load-engaging members slidably mounted for movement transversely and bodily of said carriage, and means for moving the said load-engaging members transversely of the said carriage, the said means comprising a hydraulic unit mounted on said frame and comprising a cylinder element and a piston element, means connecting one of the said elements with both of the load-engaging members for moving the said members in unison, and means for supplying hydraulic fluid to and from the said cylinder element.

2. In a truck, the combination of a frame, a substantially vertical mast supported by said frame, a carriage and means for moving the same along said mast, a supporting member extending transversely of and supported by said carriage, a pair of load-engaging members slidably mounted upon said supporting member, means for moving the said load-engaging members in unison along said supporting member, said means comprising a hydraulic unit supported by said carriage adjacent to the said supporting member and comprising a cylinder element and a piston element, said cylinder element having portions thereof interposed between said load engaging members and adapted and arranged to engage said members, and means for supplying hydraulic fluid to and from the said cylinder element.

3. In a truck, the combination of a frame, a substantially vertical mast supported by said frame, a carriage and means for moving the same along the said mast, a supporting member extending transversely of and supported by said carriage, a pair of load-engaging members slidably mounted upon said supporting member, means for moving the said load-engaging members in unison along said supporting member, said means comprising a hydraulic unit supported by said carriage adjacent to the said supporting member and comprising a cylinder element and a piston element, and means operatively connecting one of said elements with both of the said load-engaging members, means for adjusting the distance between the load-engaging members, and means for supplying hydraulic fluid to and from the said cylinder element.

4. In a truck, the combination of a frame, a substantially vertical mast supported by said frame, a carriage and means for moving the same along the said mast, a supporting member extending transversely of and supported by said carriage, a pair of load-engaging members slidably mounted upon the said supporting member, a hydraulic unit supported by said carriage adjacent to the said supporting member, the said unit comprising a piston and a cylinder reciprocable upon the said piston, the said cylinder being provided with abutments adapted and arranged to operatively engage said load-engaging members adjacent to said supporting member, and means for supplying hydraulic fluid to and from the said cylinder.

5. In the combination recited in claim 4, the cylinder being provided with a plurality of abutments adapted to be brought into engagement with the load-engaging members whereby the distance between the said members may be varied and the said members may also be moved in unison along the said supporting member.

6. In the combination recited in claim 4, the hydraulic unit being mounted above the supporting member on which the load-engaging members are mounted and the cylinder thereof being provided with a plurality of laterally spaced abutments and the upper portion of each of the load-engaging members having a notch adapted to receive an abutment therein and having a recess extending entirely across its upper portion at one end of said notch whereby the said load-engaging members may be rotated upon the said supporting member to permit the notches to be moved out of register with the abutments and to permit the load-engaging members to be moved longitudinally of the supporting member thereby to bring the notches thereof into register with and in position to be engaged by another abutment on the said cylinder.

7. In a truck, the combination of a body frame, a substantially vertical mast supported by said body frame, a carriage comprising a frame and means for moving the same along the said mast, a supporting member extending transversely of and supported by the upper portion of the carriage frame, a pair of load carrying forks each having a vertical portion and a horizontally extending portion, with the upper ends of the vertical portions slidably mounted on the said supporting member, and means for moving the said forks transversely along the said supporting member, a bearing plate carried by and extending across the carriage frame below the said supporting member, and a vertical roller carried by each of said forks adjacent to the lower end of its vertical portion and adapted to engage and roll upon the said bearing plate.

ELVERTON W. WEAVER.